July 22, 1969   R. A. LOUKS ET AL   3,456,652
BLOWING APPARATUS FOR USE WITH THRESHING MACHINE RIDDLES
Filed Dec. 20, 1965   3 Sheets-Sheet 2

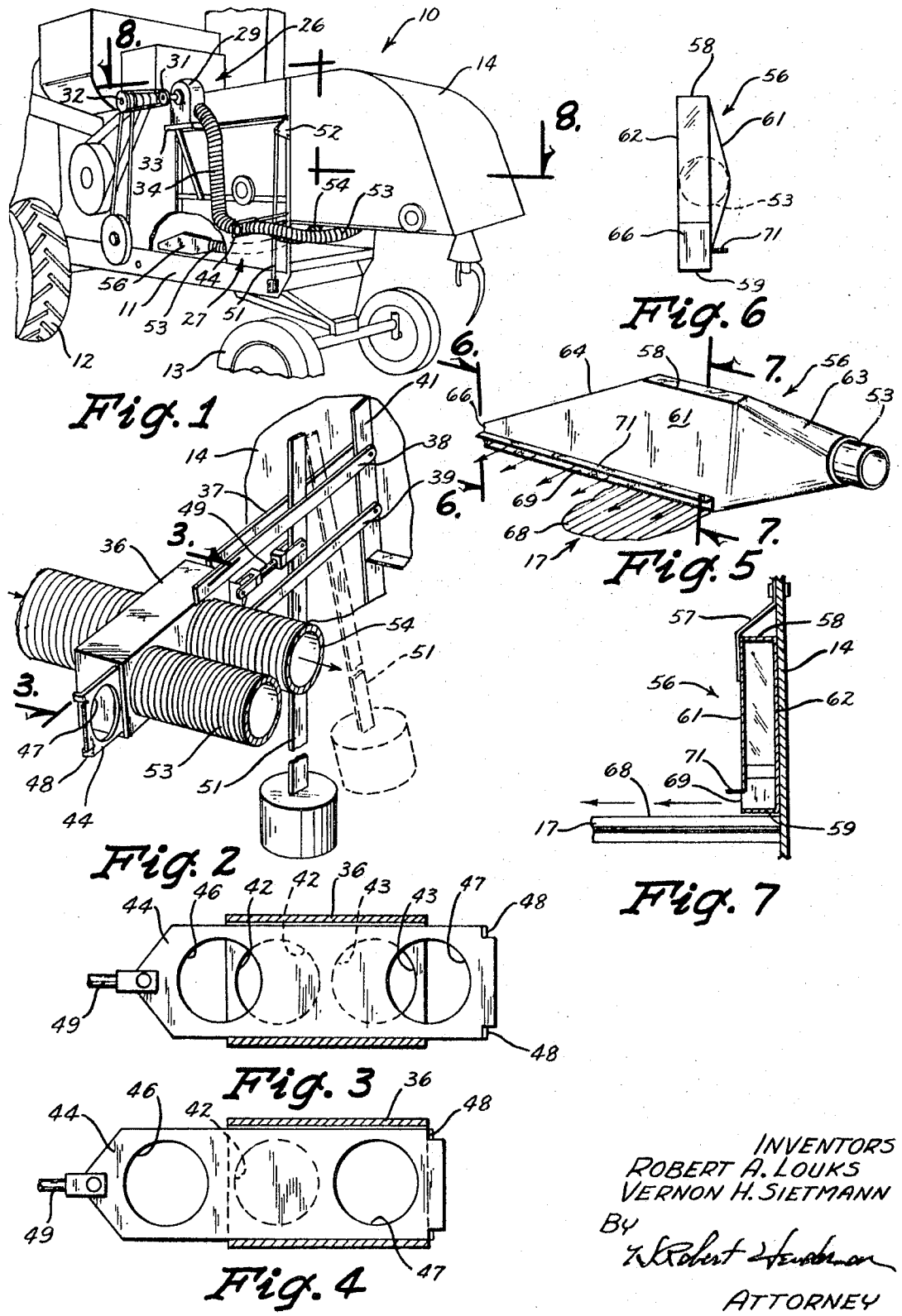

INVENTORS
ROBERT A. LOUKS
VERNON H. SIETMANN
BY
ATTORNEY

July 22, 1969 R. A. LOUKS ET AL 3,456,652
BLOWING APPARATUS FOR USE WITH THRESHING MACHINE RIDDLES
Filed Dec. 20, 1965 3 Sheets-Sheet 3
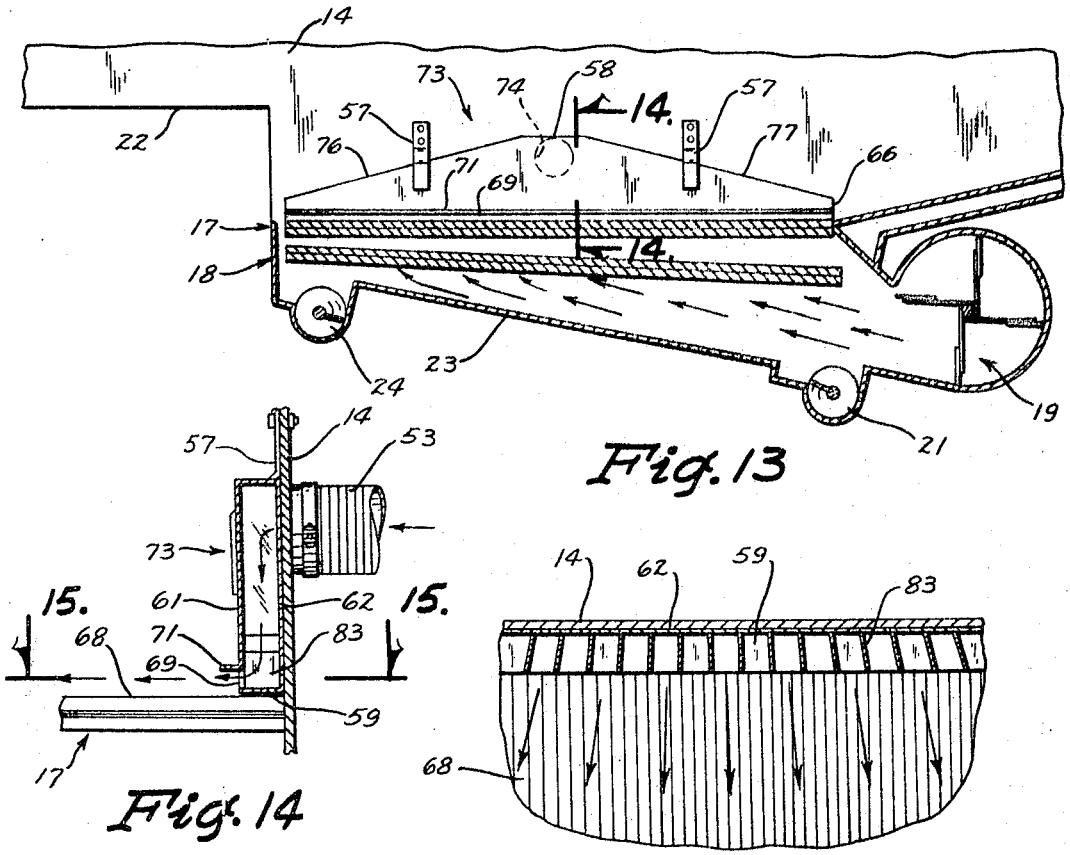
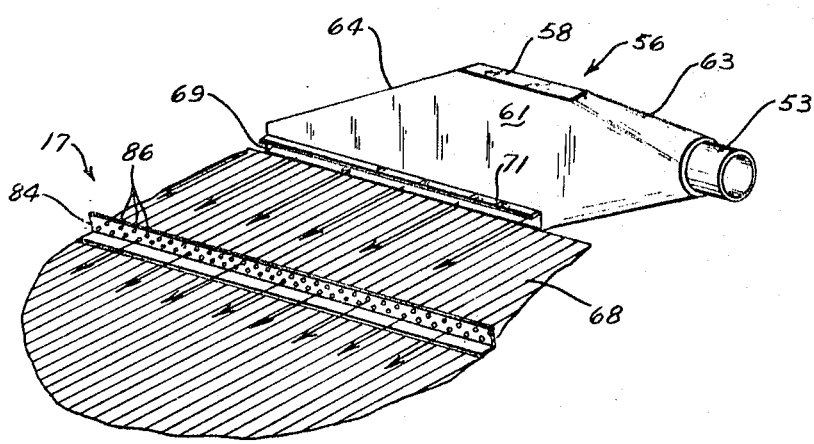
INVENTORS
ROBERT A. LOUKS
VERNON H. SIETMANN
BY
J. Robert Henderson
ATTORNEY 3,456,652
BLOWING APPARATUS FOR USE WITH THRESH-
ING MACHINE RIDDLES
Robert A. Louks and Vernon H. Sietmann, Gilman,
Iowa; said Sietmann assignor of fourteen-fortieths
to Gerald F. Dendel
Filed Dec. 20, 1965, Ser. No. 514,859
Int. Cl. A01f 12/48, 12/44; B07b 3/00
U.S. Cl. 130—27                                    10 Claims

ABSTRACT OF THE DISCLOSURE

An apparatus for maintaining the grain on the upper surface of a combine chaffer sieve in a level condition during reciprocation of the sieve and operation of the combine at all times on even or uneven terrain by moving a pair of oppositely directed streams of air under constant pressure across the chaffer sieve at the forward end thereof, with the air being emitted from a pair of elongated manifolds having elongated slots formed therein extended longitudinally of, parallel to, and above the surface of the sieve.

---

This invention relates generally to a grain harvester, and more particularly to means for maintaining the grain being separated from the straw and chaff in a level condition.

In recent years, the combine harvester, or harvester-thresher, has become the universally accepted machine for harvesting grain crops. A conventional machine of this character comprises a body unit containing threshing and separating apparatus, which carries in front of it a header unit containing grain cutting and conveying apparatus. As the machine is moved through the fields, grain cut by the cutting apparatus is conveyed to the body unit where it is threshed, and where the grain kernels are separated from the straw and chaff.

Conventional grain harvesters include as a part of the separating mechanism horizontally disposed screens or sieves upon which the kernels, chaff, and unthreshed heads are deposited after the straw is separated from them. The screens or sieves are reciprocated rapidly in a fore and aft direction in the path of a rearwardly and upwardly directed stream of air from a fan mounted in the body unit to separate the kernels from the chaff and unthreshed heads. The small, relatively heavy kernels pass through the screens and are collected therebeneath. The light chaff is blown out of the rear end of the body unit. The unthreshed heads, being too large to pass through the screens but too heavy to be blown with the chaff, drop from the rear edges of the screens and are collected for rethreshing.

It can readily be seen that for the separation process to be efficient so as to separate all the kernels from the straw and chaff, the grain must be maintained in a level condition on top of at least the uppermost screen. In operation of this type machine over fairly level terrain, the problem is not too serious. One present day method of solving the present problem is by the use of laterally spaced dividers or separators extended longitudinally on top of the screens.

In hilly areas, however, the problem is more serious, losses of from 5–10 bushels of grain an acre being reported, due to the uneven distribution of the grain on the screens. Many solutions of this problem have been suggested, with several being presently used. The great majority of these deal with mechanisms for maintaining the screens themselves level during movement of the combine over the hilly terrain.

Other mechanisms deal with adjusting the stream of air, blown upwardly from below and at the rear of the screens, in relation to the tilting of the screens. These have not proved completely satisfactory, however, due to one or more reasons.

Applicant's solution is a rather simple one when viewed after the fact, but the efficiency and effectiveness of which is nearly perfect. Rather than maintaining a screen level, applicants choose to maintain the grain level. This can readily be accomplished by a blanket of air blown from both sides of a screen substantially, at least initially, normal to the flow of the grain. The opposed air blankets are pushed closely over and in directions parallel to the surface of the screen, and tangential to the normal flow of the grain, with the pressure along the entire length of the air stream being the same. Putting it another way, the air blankets move parallel to and then tangentially of the longitudinal axis of the transporting axle of the machine.

It has been found that the use of the opposed streams beginning at the forward end of the upper screen and extended rearwardly aproximately one-third the length thereof, with the air being emitted from a pair of manifolds at a static pressure of from eight to ten inches, is preferable. The static pressure maintains the air blankets moving as a body angularly to the longitudinal flow of the grain and foreign material associated therewith over the surface of the riddle. Importantly, the blankets of air attack the grain and other material as they move over the riddle only.

It is, therefore, an object of this invention to provide an improved combine, particularly in the increased efficiency of the grain separating structure.

It is another object of this invention to provide an apparatus operable to maintain the grain on the upper surface of a separator chaffer or riddle in a level condition during reciprocation of the riddle, irrespective of the lateral inclination of the combine.

Another object of this invention is to provide such an apparatus which can be installed initially as an integral part of a new combine, or which can readily be installed after manufacture of the combine, as an accessory item.

Yet another object of this invention is to provide such an apparatus for emitting an opposed pair of blankets of air under pressure in directions initially normal to the flow of the grain over a riddle, which blankets move directly over and parallel to the surface of the riddle.

Still another object of this invention is to provide such an apparatus with an air supply system utilizing a pair of manifolds mounted on opposite sides of a riddle such that blankets of air emitted therefrom over the surface of the riddle are under static pressure, thereby enabling more accurate direction and control of the air with reference to a fluctuating demand placed thereon.

It is another object of this invention to provide such an apparatus wherein the place and amount of air being directed over a riddle is completely determined by the inclination of the combine relative to a level terrain.

Yet another object of this invention is to provide such an apparatus wherein opposed blankets of air are forced directly over and parallel to the surface of a riddle even when said surface is substantially horizontal.

Another object of this invention is to provide such an apparatus useable in conjunction with standard dividers, and wherein the blankets of air are capable of reaching the opposite side of the riddle.

Another object of this invention is to provide such an apparatus which is simple, rugged, economical to manufacture, easily maintained, and effective in operation.

These objects, and other features and advantages of this invention will become readily apparent upon reference to the following description when taken in conjunction with the accompanying drawings, wherein:

FIG. 1 is a fragmentary, perspective view of a conventional combine to which the apparatus of this invention has been attached;

FIG. 2 is an enlarged, fragmentary, perspective view of a detail part of the air supply unit of this invention, showing alternate positions of an element by the use of full and dotted lines;

FIG. 3 is an enlarged sectional view of a valve unit taken along the line 3—3 in FIG. 2, and showing one condition thereof;

FIG. 4 is a view similar to FIG. 3 and showing an alternate condition thereof;

FIG. 5 is an enlarged detail view of one of a pair of manifolds included as a part of said invention;

FIG. 6 is an end elevational view of said manifold as viewed along the line 6—6 in FIG. 5;

FIG. 7 is a sectional view taken along the line 7—7 in FIG. 5;

Figure 8:
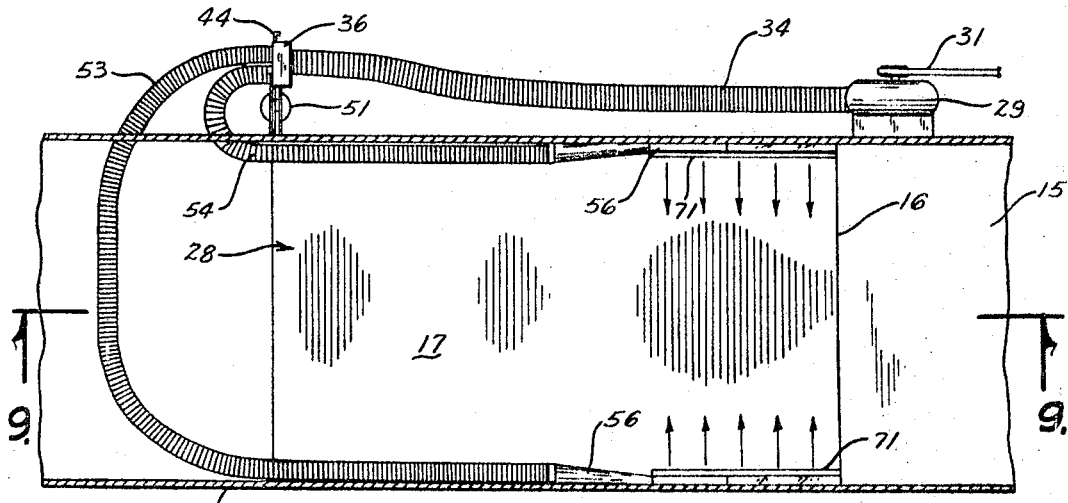
FIG. 8 is an enlarged plan view of the upper riddle and associated parts of the combine of this invention, showing the internal placement of the manifolds and air supply conduits.
Figure 9:
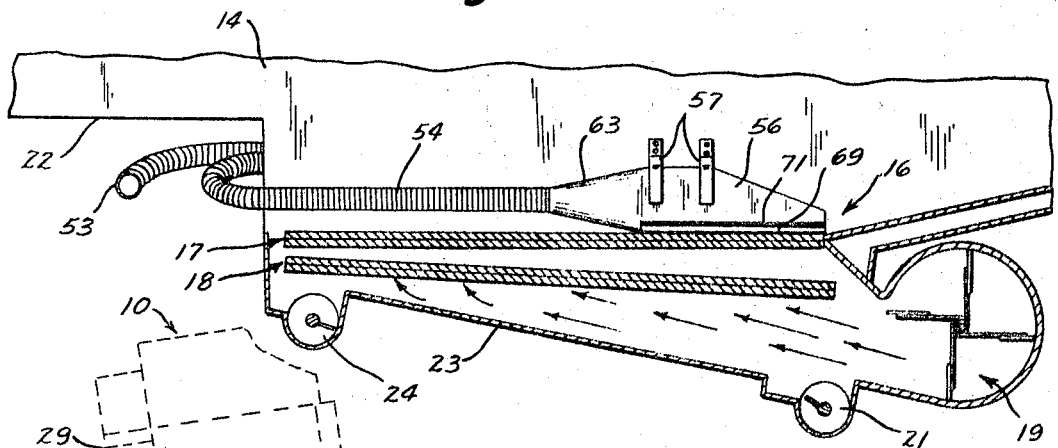
FIG. 9 is a sectional view taken along the line 9—9 in FIG. 8.
Figure 10:
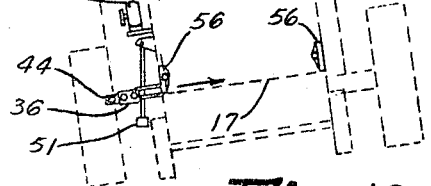
Figure 11:
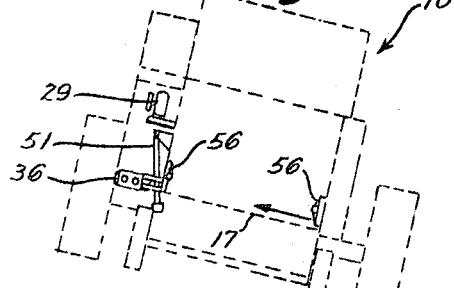
Figure 12:
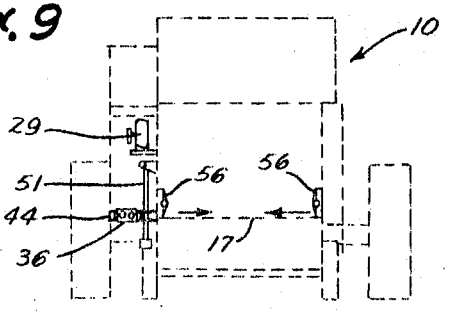

FIGS. 10, 11, and 12 are reduced schematic views as seen from the rear of the combine showing by the use of arrows the flow of air across an upper riddle, the combine as shown in phantom being inclined in one direction or another, and level relative to a horizontal plane;

FIG. 13 is a view similar to FIG. 9, and showing a modification of the embodiment of FIGS. 1–9;

FIG. 14 is an enlarged sectional view taken along the line 14—14 in FIG. 13;

FIG. 15 is a horizontal sectional view taken along the line 15—15 in FIG. 14, and showing a fragment of the FIG. 13 manifold; and FIG. 16 is a fragmentary, perspective view of a manifold shown in cooperation with a perforated divider.

Referring to the drawings, the apparatus of this invention is shown attached to a conventional combine indicated generally at 10 in FIG. 1. The combine 10 includes a frame 11 supported by a pair of drive wheels 12 (only one showing) and a pair of rear dolly wheels 13.

The threshing and separating elements of the combine are mounted inside a housing 14, the bottom rear area of which is open. As is well known in the art, after the threshing operation, about ninety percent of the grain is passed over a grain pan 15 (FIG. 8) downwardly to a cleaning mechanism. Grain still remaining in the straw is dislodged by commonly called "straw walkers" (not shown) which are mounted above the cleaning mechanism. Operation of the straw walkers effects a final separation of the grain, whereupon the grain falls downwardly either directly onto the cleaning mechanism, or onto a return conveyor for movement to the rear of the mechanism indicated generally at 16 in FIG. 8.

The cleaning mechanism itself comprises a pair of upper and lower screens or sieves 17 and 18 (FIG. 9) and a cleaning fan 19. The members 17 and 18 shall be termed riddles hereinafter. The fan 19 is mounted at the base of the housing 14 below and forwardly of the riddles 17 and 18 for the purpose of creating a blast of air, indicated by arrows in FIG. 9, upwardly and rearwardly through the riddles 17 and 18. The riddles are reciprocated backwards and forwards longitudinally of the housing 14 to agitate, in conjunction with the air from the cleaning fan 19, the material deposited thereon. Grain kernels deposited on the riddles 17 and 18 are permitted to work therethrough and drop onto a collecting pan 23 therebeneath which forms part of the bottom of the housing 14.

The pan 23 (FIG. 9) contains a grain auger 21 which transports the grain transversely to an elevator (not shown) where it is elevated to a grain tank (not shown) on the machine. Chaff and other foreign material deposited on the riddles 17 and 18 is caught in an air stream and blown out a discharge opening 22 provided by the housing 14. Unthreshed heads which do not work through the riddles are moved to the rear thereof and permitted to drop off into a tailings auger 24 for return to the threshing cylinder (not shown) for recirculation through the machine.

The apparatus of this invention includes generally an air supply unit 26 (FIG. 1), an air control unit 27, and an air distribution unit 28 (FIG. 8).

The air supply unit 26 (FIG. 1) includes a blower fan 29 having a predetermined rating, and operated by a belt and pulley device 31 off a pulley unit 32 of the combine. The blower fan 29 is supported on a mounting bracket 33 secured to one side of the housing 14, and forces air through a flexible tube 34 of appropriate dimensions to the air control unit 27.

The air control unit 27 (FIGS. 1 and 2) comprises an enclosed valve housing 36 of a rectangular structure supported by a plurality of straps 37, 38, and 39, which straps are secured at their inner ends to a part 41 (FIG. 2) of the frame 14. The valve housing 36 is provided with an inlet opening (not shown) for receiving air from the supply tube 34, and includes also a pair of laterally spaced, identical discharge openings 42 and 43 (FIGS. 3 and 4).

The amount of air under pressure passed through the openings 42 and 43 is determined by a valve plate 44 (FIG. 3) reciprocally inserted through the housing 36 for lateral movement relative to the discharge openings 42 and 43, and also lateral relative to the direction of travel of the combine 10. The valve plate 44 has a pair of laterally spaced openings 46 and 47 formed therein which are identical in size to the openings 42 and 43, but which are spaced further apart as best illustrated in FIG. 3.

The plate 44 is provided with one or more limit lugs 48 (FIG. 2) for limiting the stroke of the plate 44 inwardly of the housing 36, or vice versa. The stroke is adjustable by means of an adjustment link 49 pivotally connected between the inner end of the valve plate 44 and a portion of a pendulum 51. Referring to FIG. 1, it is clearly seen that the pendulum 51 is pivotally connected at its upper end to a bracket 52 secured to the housing 14, and swings back and forth, or laterally relative to the valve housing 36 and the combine housing 14, between the pair of straps 37 and 38.

Referring to FIGS. 3 and 4, it can readily be seen that when the pendulum 51 is suspended on a vertical axis, the valve plate 44 is perfectly centered within the valve housing 36. Thus, air from the blower fan 29 via the tube 34 flows into the valve housing 36 and evenly into the discharge openings 42 and 43, the latter being substantially but not completely closed by the valve plate 44 (FIG. 3).

Should the combine 10 be inclined to the left as viewed in FIG. 10, whereupon the pendulum swings away from the side of the housing 14 (FIG. 2), the valve housing 36 (FIG. 4) will actually move to the right of the valve plate 44. In this position, the openings 42 and 46 are aligned to pass air therethrough, whereas the discharge opening 43 is closed off by the valve plate 44.

In the position of FIG. 4, the housing 36 is shown engaged with a limit lug 48, whereupon the rightmost opening 47 in the valve plate 44 is aligned with the discharge opening 43, thereby permitting a full flow of air outwardly through said discharge opening 43. Conversely, discharge opening 42 in the valve housing 36 is completely closed by the valve plate, whereupon no air is passed therethrough. Both discharge openings 42 and 43 are fluidly connected to a pair of flexible tubes 53 and 54 (FIG. 2) for transmitting the supply of air therethrough to the air distribution unit 28 (FIG. 8).

The air distribution unit 24 (FIGS. 8 and 9) comprises a pair of oppositely arranged manifolds 56 each supported on the inner sides of the housing 14 by a pair of brackets 57. As each manifold 56 is identical, with the exception that they are adapted for right and left mounting, only one therefore will be described. The manifold 56 (FIGS. 5 and 7) includes an upper wall 58, a flat and straight bottom wall 59, and a pair of parallel, upstanding laterally spaced sidewalls 61 and 62, forming thereby a substantially enclosed housing. The manifold includes a nozzle-like receiving end 63 which is attached to a respective tube 53 or 54, with the opposite end upper wall tapering at 64 downwardly toward the bottom wall 59 as best illustrated in FIG. 9.

It is also shown in FIG. 9 that the innermost end 66 of each manifold 56 is located directly at the rear 16 of the cleaning mechanism, where the riddles 17 and 18 begin. As best seen in FIG. 7, the bottom wall 59 of each manifold extends substantially level with the upper surface 68 of the upper riddle 17.

Directly above the bottom wall 59 and extended substantially the entire length of the manifold as regards to the bottom wall 59, a slot 69 is formed. The upper and lower edges of the slot are parallel, the lower edge actually being the outer edge of the bottom wall 59 (see FIG. 7). A deflector 71 is formed above the upper edge of the slot 69 and extends laterally outwardly over the riddle 17 (FIG. 7). Referring to FIG. 8, it is seen that the length of the slots 69 in both manifolds 56 is approximately one-third the length of the upper riddle 17, said one-third being the forward or innermost one-third of the riddle 17.

By this arrangement, should the combine 10 be traveling over a relatively level surface, such that the pendulum 51 is suspended vertically, with the valve plate 44 therefore disposed in its FIG. 3 condition, a small volume of air of a predetermined pressure is emitted from both manifolds 56 (FIG. 8) via their slots 69. A pair of blankets of air under pressure are thus forced laterally of the riddle 17 toward each other directly over and parallel to its surface 68. The purpose for the air being emitted from the manifold slots 69 when the combine 10 is traveling over level terrain is to insure a continual cleaning and areating of the granular material being passed over the upper riddle 17. Furthermore, it has been found that due to the action of the cleaning fan 19 (FIG. 9) an area of the upper riddle 17 at the innermost end thereof receives such a blast of air that a bald spot occurs, an area where no grain can be cleaned and separated. By means of the air forced laterally thereover by the manifolds 56, the blast of air from the cleaning fan 19 is subdued such that normal separating action of the upper riddle 17 is retained.

Should the combine 10 be tilted to the left as viewed in FIG. 10, the valve plate 44 would be moved relative to the valve housing 36 such that the valve plate 44 would be in the position illustrated in FIG. 2. In this condition, the control opening 46 would be aligned with the valve housing discharge opening 42, whereby air under pressure would be transmitted through the tube 54 to the maniflod 56 shown in the upper portion of FIG. 8, whereby air under pressure would be emitted therefrom as indicated by the arrow in FIG. 10. Thus, any grain which tended to build up on the left side, as viewed in FIG. 10, of the upper riddle 17 would not be permitted to so built up, but would be maintained in a level condition transversely across the upper riddle 17. Thus, the leftward tilting or inclination of the combine 10 would not affect the efficiency and effectiveness of the upper riddle 17.

Should the combine 10 tilt to the right as viewed in FIG. 11, a build-up of grain on the right side as viewed of the upper riddle 17 would also be prevented due to air under pressure being emitted from the manifold 56 on the right side, as viewed in FIG. 11, of the upper riddle 17. This would result from the valve housing 36 (FIG. 4) assuming a relationship with the valve plate 44 best illustrated in FIG. 4, wherein the openings 47 and 43 are aligned.

The efficiency of the invention is enhanced further by providing a blower fan 29 which acts as an air compressor such that its discharge opening to the tube 34 is larger than the total opening of a slot 69 in a manifold 56. The efficiency and capacity of the fan 29 is such that even though the valve plate 44 remains in its FIG. 2 or FIG. 3 position indefinitely, where either discharge opening 42 or 43 is completely open, the same amount of predetermined pressure is available to the valve housing 36 from the fan 29. By this arrangement, static pressure of from eight to ten inches is obtained in each manifold 56 whereby the blankets of air under a maintained, predetermined pressure being emitted through the slots 69 have a great effectiveness as they travel directly over the surface 68 of the upper riddle 17.

Referring to FIGS. 13–15, a modification of the manifold 56 is illustrated. All elements identical to the embodiment of FIGS. 2–9 which are the same are indicated by like reference numerals.

The manifold 73 of FIG. 13 is substantially identical to the manifold 56, except for an opening 74 provided in the rear wall 62 thereof for fluid communication with a tube such as 53, and wherein the upper wall 58 tapers in both directions at 76 and 77. It will be noted that the length of the manifold 73 extends the full length of the upper riddle 17 (FIG. 13). By the provision of the upper central opening 74, neither of the delivery tubes 53 and 54 need be extended to the rear and beneath the housing 14 as shown in FIG. 8. Conversely, both tubes 53 and 54 pass through the openings provided therefor in the side walls of the housing 14 for direct attachment to the opening 74 in the manifold 73.

The modified manifold 73 has an elongated slot 69 formed therein with a deflector 71, which extends the full length of the manifold wall 61 facing the riddle 17. Referring to FIG. 14, it is noted that air emitted therefrom, as indicated by the arrows, travels closely over and parallel to the upper surface 68 of the riddle 17. This air is also under a static pressure of a predetermined amount, and has the same pressure along the entire slot 69 as emitted therefrom.

Under certain circumstances, it may be desirable to direct the air in a fan-like formation from each manifold 73. To obtain this, a plurality of deflectors 83 (FIGS. 14 and 15) are secured in an upstanding manner to the bottom of the manifold, in longitudinally spaced relation. As best shown in FIG. 15, the deflectors 83 are placed themselves in a fan-like formation, when viewed in plan, extending substantially parallel to the gravitational flow of grain at the center of the manifold 73, and becoming more angularly related to said flow toward both ends of the manifold.

Referring to FIG. 16, a manifold 56 is shown assembled with a riddle 17 on which one or more dividers 84 are provided. The dividers extend longitudinally on the riddle 17, and normally there are several which are laterally spaced thereon. To enhance the use of the manifolds 56, enabling thereby the air being emitted from the slots 69 of either manifold to reach the other side of the riddle, perforations 86 are formed in each divider 84. The perforations are of a size such that the grain kernels and other material normally moving over the riddle will not clog up the perforations.

Although a preferred embodiment and several modifications of the invention have been described hereinbefore, it is to be remembered that various other modifications and alternate constructions can be made thereto without departing from the true spirit and scope of the invention as defined in the appended claims.

We claim:

1. In a threshing machine mounted on a wheeled frame, having a rotatable element, and including a housing within which a cleaning riddle is mounted for reciprocation in the direction of travel of the machine, an apparatus for opposing the lateral gravitational flow of grain over the riddle due to a lateral inclination of the machine relative to a horizontal plane, the apparatus comprising:

blower means attachable to the machine and operable to pull air in from the atmosphere;

conduit means having opposite ends, and connected at one end to said blower means for receiving and transmitting air under pressure therefrom;

manifold means mounted inside said housing on opposite sides of the riddle and connected to the other end of said conduit means, said manifold means including a pair of elongated manifold housings each having an elongated slot formed therein extended longitudinally of, parallel to, and above the surface of the riddle, said manifold means capable of directing a blanket of air across the riddle from either side thereof in a direction angular to the flow of grain, which flow is normally parallel to the direction of travel of the machine; and valve means interposed in said conduit means between said blower means and said manifold means for controlling the flow of air therethrough in response to the lateral inclination of the machine.

2. A threshing machine as defined in claim 1, and further wherein said manifold means is mounted inside said housing on opposite sides of the riddle and extended from the forward end thereof, relative to the direction of travel of the machine rearwardly approximately one-third the length thereof.

3. A threshing machine as defined in claim 1, and further wherein said blankets of air move parallel and closely to the upper surface of the riddle.

4. A threshing machine as defined in claim 1, and further wherein said valve means is operable when the machine is level to pass a reduced amount of air therethrough, and when the machine is inclined to either side to pass a maximum amount of air only to said manifold means on the low side of the riddle, being operable to cut off flow of air to said manifold means on the high side of the riddle.

5. A threshing machine as defined in claim 1, and further wherein said manifold means comprises a pair of identical, mirror-type manifold housings fluidly connected to a pair of flexible conduits fluidly connected in turn to said blower means, via said valve means, for receiving air therefrom under a predetermined static pressure, each manifold having an elongated slot formed therein from which to discharge air therethrough, each slot extended along an edge of the riddle and level with the upper surface thereof.

6. A threshing machine as defined in claim 1, and further wherein said manifold means includes a pair of flexible tubes and a pair of manifolds each fluidly connected to a tube, said tubes extended from said valve means through an open portion of the housing at the rear of the machine, and into the interior thereof, said manifolds mounted on opposite sides of the riddle and having one or more openings formed therein on a level with the upper surface of the riddle for directing blankets of air directly across and close to the upper surface.

7. A threshing machine as defined in claim 1, and further wherein the apparatus includes one or more elongated perforated dividers mounted in longitudinally extended, laterally spaced relation on and reciprocable with the riddle, said one or more dividers disposed in the path of said air blankets.

8. A threshing machine as defined in claim 5, and further wherein said manifold housings and said slots formed therein extend the entire length of the riddle.

9. A threshing machine as defined in claim 1, and further wherein said manifold means includes a pair of manifold housings within which are mounted means for directing the flow of air emitted from each manifold in variable directions.

10. A threshing machine as defined in claim 1, and further wherein said blower means is operably connected to the rotatable element of the machine for receiving operating power therefrom.

References Cited

UNITED STATES PATENTS

| | | | |
|---|---|---|---|
| 2,611,487 | 9/1952 | Stevenson | 130—27.18 XR |
| 2,694,493 | 9/1954 | Odegarden | 130—27.18 XR |
| 2,750,037 | 6/1956 | Taylor | 130—27.18 XR |

ANTONIO F. GUIDA, Primary Examiner

U.S. Cl. X.R.

209—261